United States Patent
Liu et al.

(10) Patent No.: US 11,646,675 B2
(45) Date of Patent: May 9, 2023

(54) VOLTAGE CONTROL METHOD AND SYSTEM

(71) Applicant: ZHUZHOU CRRC TIMES ELECTRIC CO., LTD., Hunan (CN)

(72) Inventors: Kean Liu, Hunan (CN); Jing Shang, Hunan (CN); Minggao Zeng, Hunan (CN); Qingliang Zhao, Hunan (CN); Shaolong Xu, Hunan (CN); Liangjie Liu, Hunan (CN); Weiwei Gan, Hunan (CN); Wei Guo, Hunan (CN); Fang Yuan, Hunan (CN); Chaoyong Lin, Hunan (CN); Xuebiao Peng, Hunan (CN); Jinwei Mo, Hunan (CN); Gengliang He, Hunan (CN); Lifen Yang, Hunan (CN); Leilei Ding, Hunan (CN); Bingzhang Li, Hunan (CN); Qiao He, Hunan (CN); Chao Du, Hunan (CN); Hao Li, Hunan (CN)

(73) Assignee: ZHUZHOU CRRC TIMES ELECTRIC CO., LTD., Hunan (CN)

( * ) Notice: Subject to any disclaimer, the term of this patent is extended or adjusted under 35 U.S.C. 154(b) by 0 days.

(21) Appl. No.: 17/775,885

(22) PCT Filed: Nov. 21, 2019

(86) PCT No.: PCT/CN2019/119850
§ 371 (c)(1),
(2) Date: May 11, 2022

(87) PCT Pub. No.: WO2021/092989
PCT Pub. Date: May 20, 2021

(65) Prior Publication Data
US 2022/0360195 A1 Nov. 10, 2022

(30) Foreign Application Priority Data

Nov. 12, 2019 (CN) .......................... 201911101544.6

(51) Int. Cl.
*H02M 7/493* (2007.01)
*G05B 19/042* (2006.01)
*H02J 3/38* (2006.01)

(52) U.S. Cl.
CPC .......... *H02M 7/493* (2013.01); *G05B 19/042* (2013.01); *H02J 3/38* (2013.01); *G05B 2219/2639* (2013.01)

(58) Field of Classification Search
CPC ................ H02M 7/493; G05B 19/042; G05B 2219/2639; H02J 3/38
See application file for complete search history.

(56) References Cited

U.S. PATENT DOCUMENTS

2004/0162691 A1 * 8/2004 Pupalaikis ............. H04B 3/462
702/106
2014/0107842 A1 4/2014 Yoon et al.
(Continued)

FOREIGN PATENT DOCUMENTS

CN 1274985 A 11/2000
CN 101795006 A 8/2010
(Continued)

OTHER PUBLICATIONS

Shanthi B., "FPGA based Fuzzy Logic Control for Single Phase Multilevel Inverter", [online], Nov. 2010 [retrieved on Sep. 13, 2022], retrieved from <http://citeseerx.ist.psu.edu/viewdoc/download?doi=10.1.1.206.4684&rep=rep1&type=pdf> (Year: 2010).*
(Continued)

*Primary Examiner* — Thomas C Lee
*Assistant Examiner* — Charles Cai
(74) *Attorney, Agent, or Firm* — Yue (Robert) Xu; Apex Attorneys at Law, LLP

(57) ABSTRACT

Provided are a method and system for controlling a voltage. The method includes: acquiring a current output voltage of
(Continued)

an inverter; calculating a current voltage error of the current output voltage relative to a given output voltage; inputting the current voltage error into a fuzzy controller to determine a target output voltage of the inverter; determining an amplitude adjustment command based on a difference between an amplitude of the target output voltage and an amplitude of the current output voltage; determining a phase adjustment command based on a difference between a phase of the target output voltage and a phase of the current output voltage; and adjusting an amplitude and a phase of an output voltage of the inverter according to the amplitude adjustment command and the phase adjustment command respectively, to maintain the output voltage of the inverter within a preset range.

3 Claims, 5 Drawing Sheets

(56) References Cited

U.S. PATENT DOCUMENTS

| | | | |
|---|---|---|---|
| 2016/0315501 A1 | 10/2016 | Long et al. | |
| 2021/0143752 A1 | 5/2021 | Zhang et al. | |

FOREIGN PATENT DOCUMENTS

| | | | |
|---|---|---|---|
| CN | 103956769 | A | 7/2014 |
| CN | 105226711 | A | 1/2016 |
| CN | 105990853 | A | 10/2016 |
| CN | 106067695 | A | 11/2016 |
| CN | 106786770 | A | 5/2017 |
| CN | 107947609 | A | 4/2018 |
| CN | 109193810 | A | 1/2019 |
| CN | 109412194 | A | 3/2019 |
| CN | 109921671 | A | 6/2019 |
| CN | 110138010 | A | 8/2019 |
| JP | 2004015923 | A | 1/2004 |
| JP | 2008199874 | A | 8/2008 |
| JP | 2009136099 | A | 6/2009 |

OTHER PUBLICATIONS

International Search Report for PCT/CN2019/119850 dated Aug. 5, 2020, ISA/CN.

Fu, Qing etc, Fuzzy PI Control over Paralleling Operation Inverters in Micro-Grid, Electrical & Energy Management Technology, Dec. 31, 2015, No. 9.

Li, Haoran etc, Research on Three-Phase Inverter Based on Fuzzy PI Control of Parameter Self-Adjustment and Repetitive Control, Electric Machines & Control Application, Dec. 31, 2015, 42(2).

Zhou, Shengling etc, Application of Fuzzy-PI Control In the Voltage Regulator For Inverter, Journal of Southwest China Normal University (Natural Science Edition), Apr. 30, 2008, vol. 33 No. 2.

Tzou, Ying-Yu etc, Fuzzy Control of a Closed-loop Regulated PWM Inverter under Large load Variations, Power Electronics & Motion Control Lab, Institute of Control Engineering National Chiao Tung Univ., Taiwan, R.O.C., Aug. 6, 2002.

Hao, Yan etc, A Novel Open-circuit Fault Diagnosis Method for Voltage Source Inverters with a Single Current Sensor. IEEE Transactions On Power Electronics, Oct. 31, 2018.

Wang, Kui etc, Neutral-point Potential Balancing of a Five-level Active Neutral-Point-Clamped Inverter, Proceedings of the CSEE, Jan. 25, 2012, vol. 32 No.3.

\* cited by examiner

VOLTAGE CONTROL METHOD AND SYSTEM

This application is a National Stage application of PCT international patent application PCT/CN2019/119850, filed on Nov. 21, 2019 which claims priority to Chinese Patent Application No. 201911101544.6, titled "VOLTAGE CONTROL METHOD AND SYSTEM", filed on Nov. 12, 2019 with the China National Intellectual Property Administration, both of which are incorporated herein by reference in their entireties.

FIELD

The present disclosure relates to the technical field of power supply by a converter, and in particular to a method and a system for controlling a voltage.

BACKGROUND

With the development of science and technology, rail transit is also developing increasingly. In the rail transit, a power supply system including multiple inverters connected in parallel is usually utilized to supply power to trains.

In a process of supplying power to a train, it is necessary to ensure that the output voltage of the inverter is remained within a certain range. A conventional method for controlling an output voltage of an inverter is a droop control method, in which a power-sharing control is realized by using an internal relation between an output power of the inverter and an amplitude and a frequency of the output voltage of the inverter, and thereby the output voltage is controlled.

However, when improving an accuracy of power sharing in a power supply system under the droop control, the output voltage of the inverters may be drooped, that is, an accuracy of the output voltage of the inverters is degraded; and the output voltage changes as the power changes, which results in a poor robustness.

SUMMARY

In view of the above, a method and a system for controlling a voltage is provided in embodiments of the present disclosure, in order to solve the problems of poor accuracy of an output voltage and poor robustness when controlling the output voltage of an inverter by the droop control method.

To achieve the above objective, the following technical solutions are provided in the embodiments of the present disclosure.

According to a first aspect of the present disclosure, a method for controlling a voltage is provided. The method is applied to a power supply network including multiple inverters connected in parallel, and the method includes: acquiring a current output voltage of an inverter; calculating a current voltage error of the current output voltage relative to a given output voltage; inputting the current voltage error into a fuzzy controller to determine a target output voltage of the inverter; determining, by using a first PI controller, an amplitude adjustment command based on a difference between an amplitude of the target output voltage and an amplitude of the current output voltage; determining, by using a second PI controller, a phase adjustment command based on a difference between a phase of the target output voltage and a phase of the current output voltage; and adjusting an amplitude of an output voltage of the inverter according to the amplitude adjustment command, and adjusting a phase of the output voltage of the inverter according to the phase adjustment command, to maintain the output voltage of the inverter within a preset range.

In a preferred embodiment, the inputting the current voltage error into a fuzzy controller to determine a target output voltage of the inverter includes: calculating a difference between a previous voltage error and the current voltage error to determine a voltage error variation;

performing, based on a preset fuzzy state universe, fuzzification on the current voltage error and the voltage error variation; performing fuzzy reasoning, by using a preset fuzzy control rule table, on the current voltage error after fuzzification and the voltage error variation after fuzzification, to determine a fuzzy value of a modulation degree of the fuzzy controller; performing de-fuzzification on the fuzzy value of the modulation degree, to calculate the modulation degree; and determining, based on the modulation degree, the target output voltage of the inverter.

In a preferred embodiment, the performing de-fuzzification on the fuzzy value of the modulation degree, to calculate the modulation degree includes: calculating the modulation degree of the fuzzy controller as $$Z = \frac{\sum x_i \times \omega_i}{\sum \omega_i},$$

where, $\chi_i$ represents the fuzzy value of the modulation degree, and $\omega_i$ represents a weight corresponding to the fuzzy value of the modulation degree.

In a preferred embodiment, the determining, based on the modulation degree, the target output voltage of the inverter includes: determining the target output voltage of the inverter by performing a sinusoidal pulse width modulation on the modulation degree.

According to a second aspect of the present disclosure, a system for controlling a voltage is provided. The system is applied to a power supply network including multiple inverters connected in parallel, and the system includes an acquiring unit configured to acquire a current output voltage of an inverter; a calculating unit configured to calculate a current voltage error of the current output voltage relative to a given output voltage; a first determining unit configured to input the current voltage error into a fuzzy controller to determine a target output voltage of the inverter; a second determining unit configured to determine, by using a first PI controller, an amplitude adjustment command based on a difference between an amplitude of the target output voltage and an amplitude of the current output voltage; a third determining unit configured to determine, by using a second PI controller, a phase adjustment command based on a difference between a phase of the target output voltage and a phase of the current output voltage; and an adjusting unit configured to adjust an amplitude of an output voltage of the inverter according to the amplitude adjustment command, and adjust a phase of the output voltage of the inverter according to the phase adjustment command, to maintain the output voltage of the inverter within a preset range.

In a preferred embodiment, the first determining unit includes: a calculating module configured to calculate a difference between a previous voltage error and the current voltage error to determine a voltage error variation; a fuzzifying module configured to perform, based on a preset fuzzy state universe, fuzzification on the current voltage error and the voltage error variation; a reasoning module configured to perform fuzzy reasoning, by using a preset fuzzy control rule table, on the current voltage error after fuzzification and the voltage error variation after fuzzification, to determine a fuzzy value of a modulation degree of the fuzzy controller; a de-fuzzifying module configured to perform de-fuzzification on the fuzzy value of the modulation degree, to calculate the modulation degree; and a determining module configured to determine, based on the modulation degree, the target output voltage of the inverter.

In a preferred embodiment, the de-fuzzifying module is configured to calculate the modulation degree of the fuzzy controller as $$Z = \frac{\sum x_i \times \omega_i}{\sum \omega_i},$$

where, $\chi_i$ represents the fuzzy value of the modulation degree, and $\omega_i$ represents a weight corresponding to the fuzzy value of the modulation degree.

In a preferred embodiment, the determining module is configured to determine the target output voltage of the inverter by performing a sinusoidal pulse width modulation on the modulation degree.

Based on the method and system for controlling a voltage provided in the embodiments of the present disclosure, in the method: a current output voltage of an inverter is acquired; a current voltage error of the current output voltage relative to a given output voltage is calculated; the current voltage error is inputted into a fuzzy controller to determine a target output voltage of the inverter; an amplitude adjustment command is determined, by using a first PI controller, based on a difference between an amplitude of the target output voltage and an amplitude of the current output voltage; a phase adjustment command is determined, by using a second PI controller, based on a difference between a phase of the target output voltage and a phase of the current output voltage; and an amplitude of an output voltage of the inverter is adjusted according to the amplitude adjustment command, and a phase of the output voltage of the inverter is adjusted according to the phase adjustment command, to maintain the output voltage of the inverter within a preset range. In the solution, a current output voltage is acquired, and a current voltage error of the current output voltage relative to a given output voltage is calculated. The current voltage error is used as an input to a fuzzy controller to determine a target output voltage of the inverter. An amplitude and a phase of the output voltage of the inverter are adjusted based on the target output voltage, by using a first PI controller and a second PI controller respectively, so as to maintain the output voltage of the inverter within a preset range. It is not necessary to apply a droop control on the output voltage of the inverter, and therefore accuracy of the output voltage of the inverter is improved and robustness is improved.

BRIEF DESCRIPTION OF THE DRAWINGS

In order for a clearer illustration of technical solutions in embodiments of the present disclosure or the conventional technology, drawings used in the description of the embodiments or the conventional technology are described briefly hereinafter. Apparently, the drawings described in the following illustrate only some embodiments of the present disclosure, and other drawings may be obtained by those ordinarily skilled in the art based on these drawings without any creative effort.

DETAILED DESCRIPTION

The technical solutions in the embodiments of the present disclosure are described clearly and completely in conjunction with the drawings of the embodiments of the disclosure hereinafter. It is apparent that the described embodiments are only some, rather than all, embodiments of the present disclosure. Any other embodiments obtained by those skilled in the art based on the embodiments in the present disclosure without any creative effort shall fall within the protection scope of the present disclosure.

In this specification, terms "include", "comprise" or any other variants thereof are intended to be non-exclusive. Therefore, a process, method, article or device including a series of elements includes not only these elements but also elements that are not enumerated, or elements that are inherent to the process, method, article or device. Unless expressively limited otherwise, a process, method, article or device limited by "comprising/including a(n) . . . " does not exclude existence of another identical element in such process, method, article or device.

It can be known from the background section that a conventional method for controlling an output voltage of an inverter is a droop control method. However, when improving an accuracy of power sharing in a power supply system under the droop control, the output voltage of the inverter may be drooped, and an accuracy of the output voltage of the inverter is degraded. In addition, the output voltage changes as the power changes, which results in a poor robustness.

Therefore, a method and system for controlling a voltage is provided in the embodiments of the present disclosure, in which a fuzzy controller is utilized to determine a target output voltage of an inverter; and an amplitude and a phase of an output voltage of the inverter are adjusted based on the target output voltage and PI controllers, so as to maintain the output voltage of the inverter within a preset range. In this way, the accuracy of the output voltage of the inverter and the robustness are improved.

The method and system for controlling a voltage in the embodiments of the present disclosure are applicable to a power supply network including multiple inverters connected in parallel. For a better explanation of a structure of the power supply network, description is made by way of an example in conjunction with FIG. 1 which shows a schematic diagram of a parallel connection of multiple inverters. It should be noted that the content shown in FIG. 1 is illustrative only.

Figure 1:
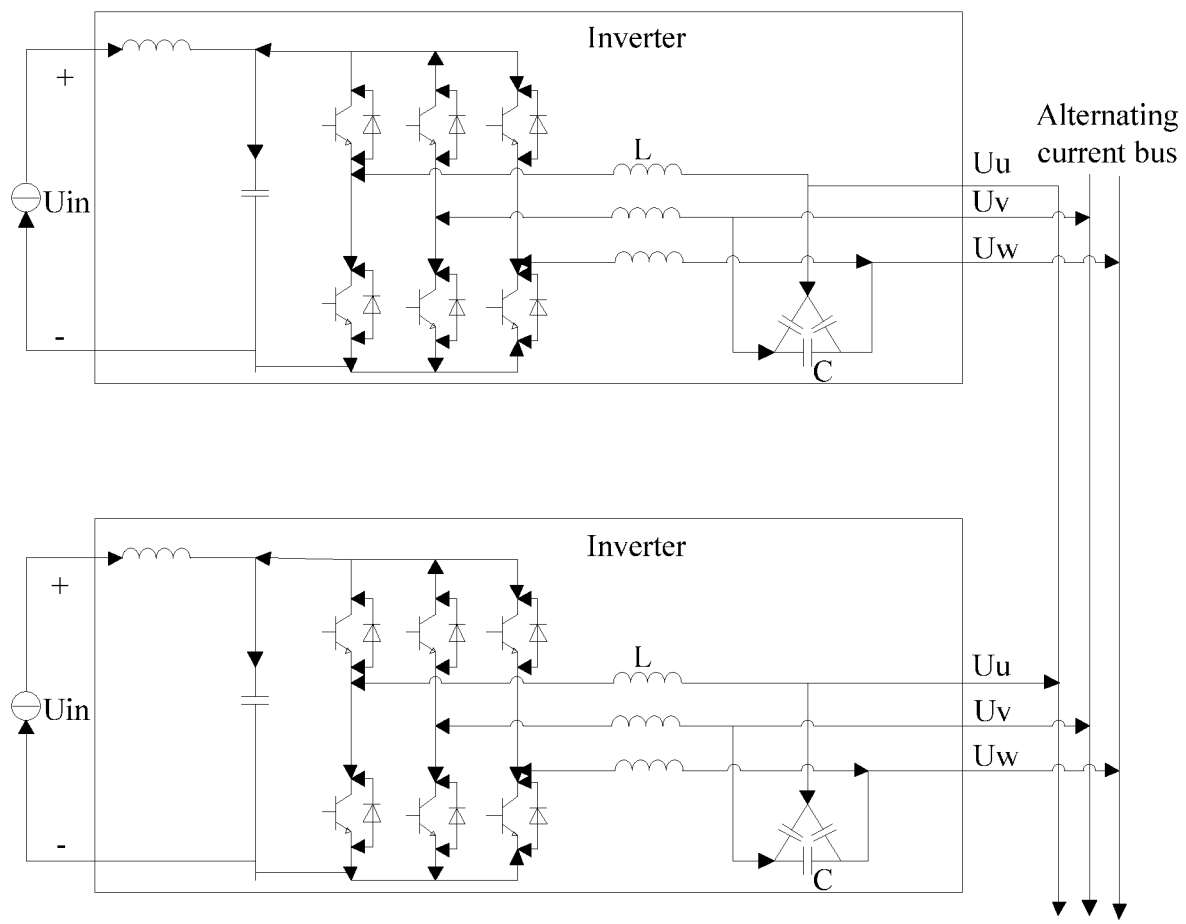
FIG. 1 is a schematic diagram of a parallel connection of multiple inverters according to an embodiment of the present disclosure.

In FIG. 1, output ends of two inverters are short-circuited in parallel to form an alternating current, AC, bus. The power supply network formed by the two inverters supplies power to any load connected to the AC bus.

Parameters of each of the inverters in FIG. 1 are listed below:

Output filter inductance: 3*0.27 mH;
Output filter capacitance: 3*100 μF, in a delta connection;
Switching frequency: 1.35HZ;
Rated output line voltage: 380V.

Figure 2:
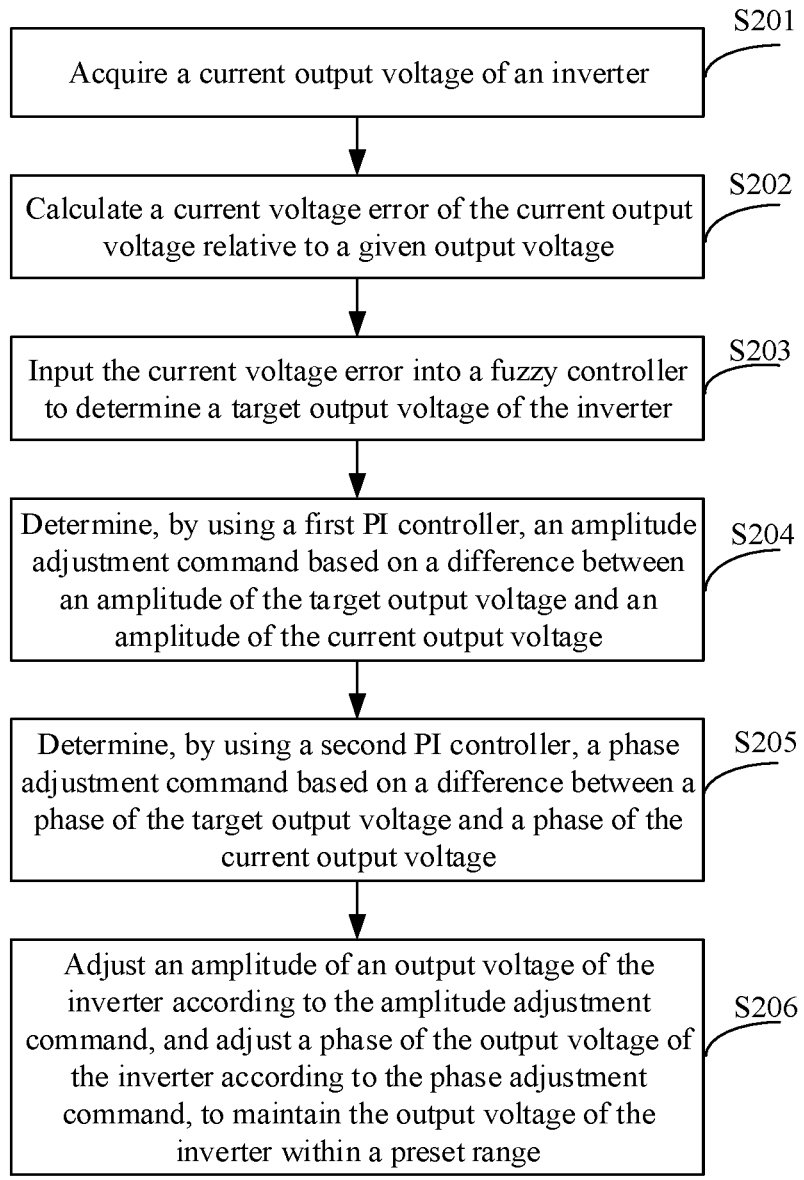
FIG. 2 is a flowchart of a method for controlling a voltage according to an embodiment of the present disclosure.

FIG. 2 shows a flowchart of a method for controlling a voltage according to an embodiment of the present disclosure. Referring to FIG. 2, the method for controlling a voltage includes steps S201 to S206.

In step S201, a current output voltage of an inverter is acquired.

In an implementation of step S201, a voltage at an output end of the inverter is acquired as the current output voltage of the inverter.

In step S202, a current voltage error of the current output voltage relative to a given output voltage is calculated.

In an implementation of step S202, it should be noted that the given output voltage of the inverter is preset; and after the current output voltage is acquired, an error between the given output voltage and the current output voltage is calculated as the current voltage error.

In step S203, the current voltage error is inputted into a fuzzy controller to determine a target output voltage of the inverter.

In an implementation of step S203, the current voltage error is used as an input to the fuzzy controller for a fuzzy control operation to obtain the target output voltage of the inverter.

In step S204, an amplitude adjustment command is determined, by using a first PI controller, based on a difference between an amplitude of the target output voltage and an amplitude of the current output voltage.

It should be noted that the PI controller (proportional integral controller) is a linear controller, by which a control deviation is obtained based on a given value and an actual output value, a proportion and integration of the control deviation are linearly combined to generate a control amount, and a controlled object is controlled with the control amount.

In an implementation of step S204, the amplitude of the current output voltage is calculated, and the difference between the amplitude of the target output voltage and the amplitude of the current output voltage is inputted to the first PI controller to determine the amplitude adjustment command.

In step S205, a phase adjustment command is determined, by using a second PI controller, based on a difference between a phase of the target output voltage and a phase of the current output voltage.

In an implementation of step S205, the phase of the current output voltage is calculated, and the difference between the phase of the target output voltage and the phase of the current output voltage is inputted to the second PI controller to determine the phase adjustment command.

In step S206, an amplitude of the output voltage of the inverter is adjusted according to the amplitude adjustment command, and a phase of the output voltage of the inverter is adjusted according to the phase adjustment command, to maintain the output voltage of the inverter within a preset range.

It should be noted that the output voltage of the inverter is related to an amplitude and a phase of the output voltage, and therefore the output voltage may be adjusted by adjusting the amplitude and the phase of the output voltage of the inverter.

In an implementation of step S206, the amplitude of the output voltage of the inverter is adjusted according to the amplitude adjustment command determined by using the first PI controller, and the phase of the output voltage of the inverter is adjusted according to the phase adjustment command determined by using the second PI controller, so as to maintain the output voltage of the inverter within a preset range.

Figure 3:
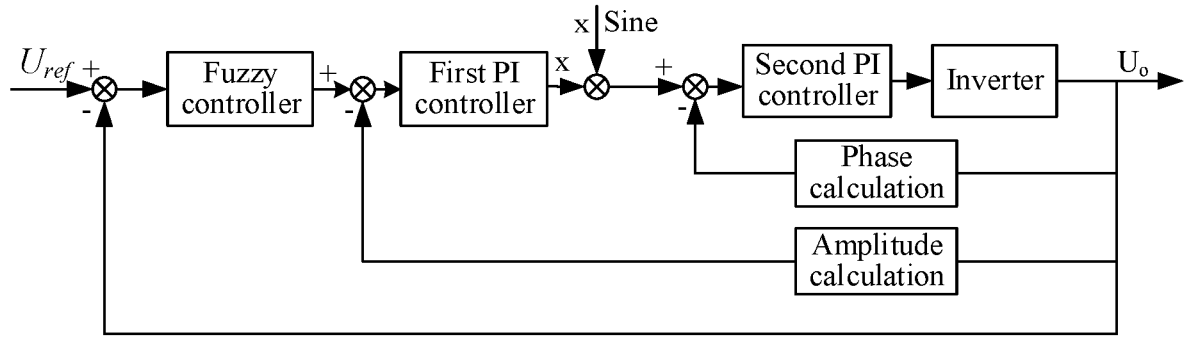
FIG. 3 is a schematic diagram of a voltage control logic according to an embodiment of the present disclosure.

For a better explanation of a process of controlling the output voltage of the inverter as mentioned in steps S201 to S206, description is made by way of an example in conjunction with FIG. 3 which shows a schematic diagram of a voltage control logic. It should be noted that the content shown in FIG. 3 is illustrative only. In FIG. 3, $U_{ref}$ represents a given output voltage, and $U_o$ represents a current output voltage.

In FIG. 3, a difference between the given output voltage and the current output voltage is inputted to a fuzzy controller to determine a target output voltage of the inverter. A difference between an amplitude of the target output voltage and an amplitude of the current output voltage and a difference between a phase of the target output voltage and a phase of the current output voltage are determined. An amplitude of an output voltage of the inverter is adjusted by using a first PI controller, and a phase of the output voltage of the inverter is adjusted by using a second PI controller, to maintain the output voltage of the converter within a preset range.

In the embodiments of the present disclosure, a current output voltage is acquired, and a difference between the given output voltage and the current output voltage is inputted to the fuzzy controller for a fuzzy control operation to obtain the target output voltage of the inverter; a difference between an amplitude of the target output voltage and an amplitude of the current output voltage and a difference between a phase of the target output voltage and a phase of the current output voltage are determined; and an amplitude of an output voltage of the inverter is adjusted by using a first PI controller, and a phase of the output voltage of the inverter is adjusted by using a second PI controller, to maintain the output voltage of the converter within a preset range. It is not necessary to perform a droop control on the output voltage of the inverter, and therefore the accuracy of the output voltage of the inverter is improved and the robustness is improved.

Figure 4:
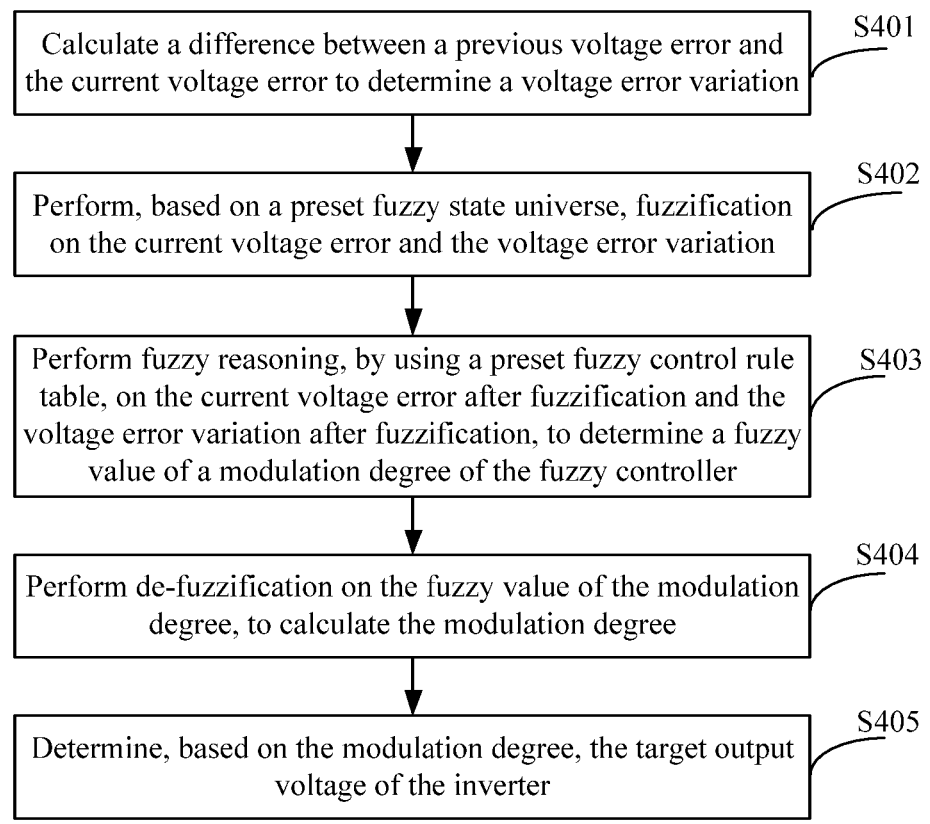
FIG. 4 is a flowchart of determining a target output voltage according to an embodiment of the present disclosure.

For a process of the fuzzy control operation mentioned in step S203 in FIG. 2 of the above embodiment of the present disclosure, reference is made to FIG. 4 which shows a flowchart of determining a target output voltage according to an embodiment of the present disclosure, including steps S401 to S405.

In step S401, a difference between a previous voltage error and the current voltage error is calculated to determine a voltage error variation.

It should be noted that in the process of the fuzzy control operation, the current voltage error and the voltage error variation are taken as observation objects. Meanwhile, a membership function corresponding to the fuzzy controller is pre-determined. The membership function is a triangular membership function, a trapezoidal membership function or a bell-shaped membership function. The membership function for the fuzzy controller is not specifically limited in the embodiments of the present disclosure.

In step S402, fuzzification is performed, based on a preset fuzzy state universe, on the current voltage error and the voltage error variation.

It should be noted that the fuzzy state universe of the current voltage error, the voltage error variation and the modulation degree of the fuzzy controller is divided into n fuzzy sets in advance. For example, the fuzzy state universe is divided into 7 fuzzy sets, i.e., {negative big (NB), negative medium (NM), negative small (NS), zero (ZO), positive small (PS), positive medium (PM), positive big (PB)}.

In an implementation of step S402, the current voltage error and the voltage error variation are limited. For example, the current voltage error is limited within a range of (−3, 3), that is, a value of the current voltage error is limited to be equal to −3 if it is less than -3, and is limited to be equal to 3 if it is greater than 3. Limitation on the voltage error variation may be performed in a similar manner.

The current voltage error and the voltage error variation are fuzzified, for example, in combination with the aforementioned limitation. A process of fuzzification on the current voltage error includes: determining that the current voltage error is NB if the current voltage error is equal to −3; determining that the current voltage error is NM if the current voltage error is between −3 and −2; determining that the current voltage error is NS if the current voltage error is between −2 and −1; determining that the current voltage error is ZO if the current voltage error is between −1 and 1; determining that the current voltage error is PS if the current voltage error is between 1 and 2; determining that the current voltage error is PM if the current voltage error is between 2 and 3; determining that the current voltage error is PB if the current voltage error is equal to 3.

The fuzzification on the voltage error variation may be performed in a similar manner.

In step S403, fuzzy reasoning is performed, by using a preset fuzzy control rule table, on the current voltage error after fuzzification and the voltage error variation after fuzzification, to determine a fuzzy value of a modulation degree of the fuzzy controller.

It should be noted that the fuzzy control rule table for the current voltage error, the voltage error variation and the modulation degree is established in advance based on expert experience. For a better explanation of specific content of the fuzzy control rule table, description is made by way of an example in conjunction with Table 1 as follows. In Table 1, e represents a current voltage error, and ec represents a voltage error variation.

TABLE 1

| e | ec | | | | | | |
|---|----|----|----|----|----|----|----|
|   | NB | NM | NS | ZO | PS | PM | PB |
| NB | PB | PB | PB | PM | PM | PS | ZO |
| NM | PB | PB | PM | PM | PS | ZO | ZO |
| NS | PB | PM | PM | ZO | ZO | ZO | NS |
| ZO | PM | PS | PS | ZO | ZO | NS | NS |
| PS | PM | PS | ZO | ZO | NS | NS | NM |
| PM | PS | ZO | ZO | NS | NS | NM | NB |
| PB | ZO | NS | NS | NM | NM | NB | NB |

In an implementation of step S403, fuzzy reasoning is performed, by using a preset reasoning rule in combination with the fuzzy control rule table, on the current voltage error after fuzzification and the voltage error variation after fuzzification, to determine a fuzzy value of the modulation degree.

In an example, supposing a modulation degree M of the fuzzy controller, a process of the fuzzy reasoning, based on Table 1, on the current voltage error after fuzzification and the voltage error variation after fuzzification includes: if e=NB and ec=NB, then M=PB; and if e=ZO and ec=NM, then M=PS. By applying the preset reasoning rule, such as those mentioned in the foregoing example, to perform the fuzzy reasoning on the current voltage error after fuzzification and the voltage error variation after fuzzification, the fuzzy value of the modulation degree is determined.

In step S404, de-fuzzification is performed on the fuzzy value of the modulation degree to calculate the modulation degree.

It should be noted that a method for the de-fuzzification on the fuzzy value includes but is not limited to a center of gravity method, a maximum membership degree method, and a weighted average method.

In an implementation of step S404, a predetermined de-fuzzification method is applied to realize de-fuzzification on the fuzzy value of the modulation degree, and thereby calculate the modulation degree.

For a better explanation of how to perform the de-fuzzification on the fuzzy value of the modulation degree, description is made by using the weighted average method as an example. Referring to equation (1), which is adopted for calculating the modulation degree of the fuzzy controller. In equation (1), $\chi_i$ represents the fuzzy value of the modulation degree, and $\omega_i$ represents a weight corresponding to the fuzzy value of the modulation degree.

$$Z = \frac{\sum x_i \times \omega_i}{\sum \omega_i} \quad (1)$$

In step S405, the target output voltage of the inverter is determined based on the modulation degree.

In an implementation of step S405, the target output voltage of the inverter is determined by performing a sinusoidal pulse width modulation on the modulation degree.

Figure 5:
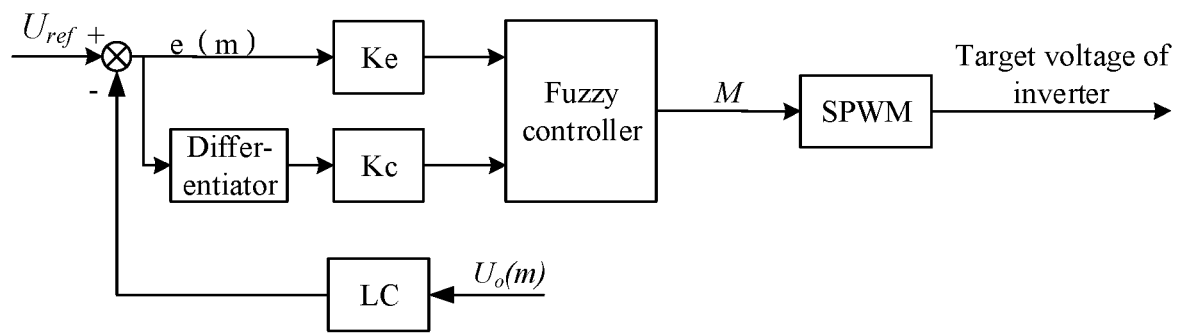
FIG. 5 is a diagram of a fuzzy control logic according to an embodiment of the present disclosure.

For a better explanation of a fuzzy control process mentioned in step S401 to S405, description is made by way of an example in conjunction with FIG. 5 which shows a diagram of a fuzzy control logic. In FIG. 5, $U_{ref}$ represents a given output voltage, $U_o(m)$ represents an output voltage of the inverter at time instant m, e(m) represents a voltage error at time instant m, Ke and Kc represent quantization factors of the fuzzy controller, and LC represents a filter circuit.

In FIG. 5, a product of e(m) and Ke is inputted to the fuzzy controller, e(m) is differentiated to obtain a voltage error variation ec(m), and a product of the voltage error variation and Kc is inputted to the fuzzy controller, so that a modulation degree M of the fuzzy controller is obtained. A sinusoidal pulse width modulation (SPWM) is performed on the modulation degree to obtain the target output voltage of the inverter.

A process of calculating e(m) and ec(m) is shown by equation (2) and equation (3):

$$e(m) = U_{ref} - U_o(m) \quad (2)$$

$$ec(m) = e'(m) = e(m) - e(m-1) \quad (3),$$

where e(m-1) represents the output voltage of the inverter at time instant m-1.

In the embodiments of the present disclosure, the voltage error and the voltage error variation are inputted to the fuzzy controller for a fuzzy control operation to obtain the modulation degree of the fuzzy controller, and a sinusoidal pulse width modulation is performed on the modulation degree to obtain the target output voltage of the inverter. The target output voltage is used as an input to the subsequent closed-loop control, in which an amplitude and a phase of the output voltage of the inverter are adjusted by using PI controllers, and thereby the output voltage of the inverter is maintained within a preset range. It is not necessary to perform a droop control on the output voltage of the inverter, and therefore the accuracy of the output voltage of the inverter is improved and the robustness is improved.

Figure 6:
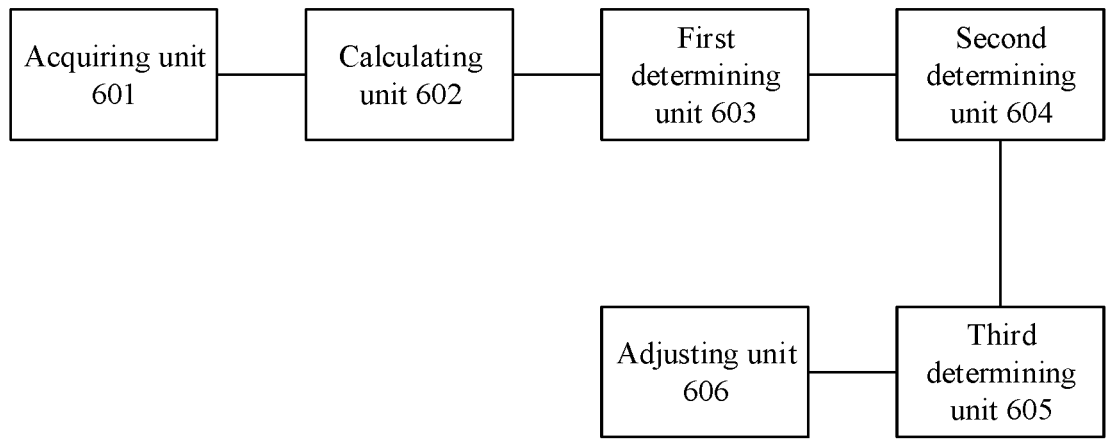
FIG. 6 is a structural block diagram of a system for controlling a voltage according to an embodiment of the present disclosure.

Corresponding to the method for controlling a voltage in the embodiments of the present disclosure, a system for controlling a voltage is further provided in the embodiments of the present disclosure. FIG. 6 is a structural block diagram of a system for controlling a voltage according to an embodiment of the present disclosure. Referring to FIG. 6, the system for controlling a voltage includes an acquiring unit 601, a calculating unit 602, a first determining unit 603, a second determining unit 604, a third determining unit 605, and an adjusting unit 606. The acquiring unit 601 is configured to acquire a current output voltage of an inverter. The calculating unit 602 is configured to calculate a current voltage error of the current output voltage relative to a given output voltage. The first determining unit 603 is configured to input the current voltage error into a fuzzy controller to determine a target output voltage of the inverter. The second determining unit 604 is configured to determine, by using a first PI controller, an amplitude adjustment command based on a difference between an amplitude of the target output voltage and an amplitude of the current output voltage. The third determining unit 605 is configured to determine, by using a second PI controller, a phase adjustment command based on a difference between a phase of the target output voltage and a phase of the current output voltage. The adjusting unit 606 is configured to adjust an amplitude of an output voltage of the inverter according to the amplitude adjustment command, and adjust a phase of the output voltage of the inverter according to the phase adjustment command, to maintain the output voltage of the inverter within a preset range.

In the embodiments of the present disclosure, a current output voltage is acquired, and a difference between the given output voltage and the current output voltage is inputted to the fuzzy controller for a fuzzy control operation to obtain the target output voltage of the inverter; a difference between an amplitude of the target output voltage and an amplitude of the current output voltage and a difference between a phase of the target output voltage and a phase of the current output voltage are determined; and an amplitude of an output voltage of the inverter is adjusted by using a first PI controller, and a phase of the output voltage of the inverter is adjusted by using a second PI controller, to maintain the output voltage of the converter within a preset range. It is not necessary to perform a droop control on the output voltage of the inverter, and therefore the accuracy of the output voltage of the inverter is improved and the robustness is improved.

In a preferred embodiment, based on FIG. 6, the first determining unit 603 includes a calculating module, a fuzzifying module, a reasoning module, a de-fuzzifying module, and a determining module. Operating principles of the modules are described as follows. The calculating module is configured to calculate a difference between a previous voltage error and the current voltage error to determine a voltage error variation. The fuzzifying module is configured to perform, based on a preset fuzzy state universe, fuzzification on the current voltage error and the voltage error variation. The reasoning module is configured to perform fuzzy reasoning, by using a preset fuzzy control rule table, on the current voltage error after fuzzification and the voltage error variation after fuzzification, to determine a fuzzy value of a modulation degree of the fuzzy controller. The de-fuzzifying module is configured to perform de-fuzzification on the fuzzy value of the modulation degree, to calculate the modulation degree. In an implementation, the de-fuzzifying module is specifically configured to calculate the modulation degree of the fuzzy controller by equation (1). The determining module is configured to determine, based on the modulation degree, the target output voltage of the inverter.

In an implementation, the determining module is specifically configured to determine the target output voltage of the inverter by performing a sinusoidal pulse width modulation on the modulation degree.

In the embodiments of the present disclosure, the voltage error and the voltage error variation are inputted to the fuzzy controller for a fuzzy control operation to obtain the modulation degree of the fuzzy controller, and a sinusoidal pulse width modulation is performed on the modulation degree to obtain the target output voltage of the inverter. The target output voltage is used as an input to the subsequent closed-loop control, in which an amplitude and a phase of the output voltage of the inverter are adjusted by using PI controllers, and thereby the output voltage of the inverter is maintained within a preset range. It is not necessary to perform a droop control on the output voltage of the inverter, and therefore the accuracy of the output voltage of the inverter is improved and the robustness is improved.

Figure 7:
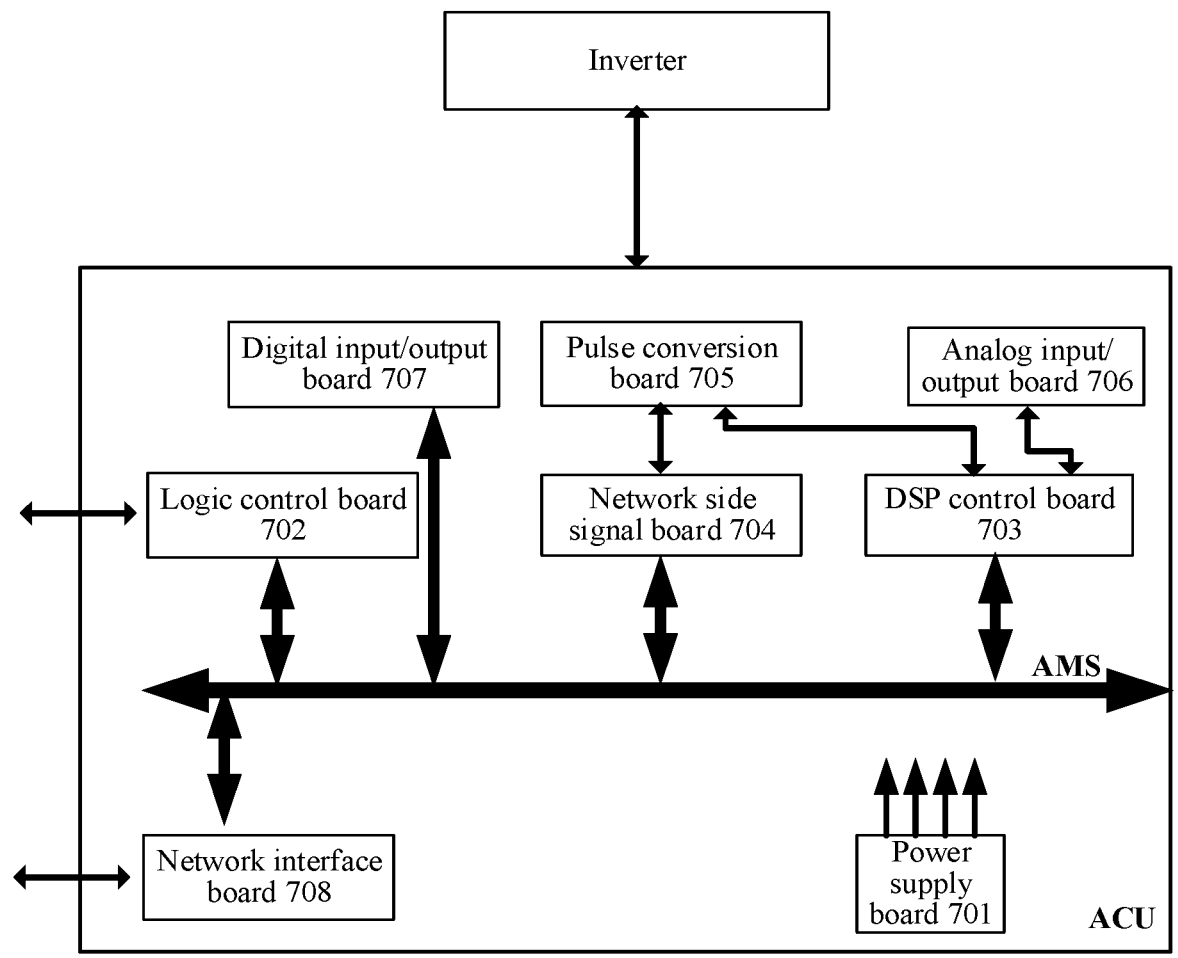
FIG. 7 is a schematic diagram of an architecture of a control device according to an embodiment of the present disclosure.

In a preferred embodiment, the method and system for controlling a voltage involved in the embodiments of the present disclosure are realized through a control device. FIG. 7 shows a schematic diagram of an architecture of a control device according to an embodiment of the present disclosure. Referring to FIG. 7, the control device includes a power supply board 701, a logic control board 702, a DSP control board 703, a network side signal board 704, a pulse conversion board 705, an analog input/output board 706, a digital input/output board 707 and a network interface board 708.

The DSP control board 703 is configured to cause the specific content of the method and system for controlling a voltage involved in the embodiments of the present disclosure to be performed.

In summary, a method and system for controlling a voltage is provided in the embodiments of the present disclosure. With the method, a current output voltage of an inverter is acquired; a current voltage error of the current output voltage relative to a given output voltage is calculated; the current voltage error is inputted into a fuzzy controller to determine a target output voltage of the inverter; an amplitude adjustment command is determined, by using a first PI controller, based on a difference between an amplitude of the target output voltage and an amplitude of the current output voltage; a phase adjustment command is determined, by using a second PI controller, based on a difference between a phase of the target output voltage and a phase of the current output voltage; and an amplitude of an output voltage of the inverter is adjusted according to the amplitude adjustment command, and a phase of the output voltage of the inverter is adjusted according to the phase adjustment command, to maintain the output voltage of the inverter within a preset range. In the solution, a current output voltage is acquired, and a current voltage error of the current output voltage relative to a given output voltage is calculated. The current voltage error is used as an input to a fuzzy controller to determine a target output voltage of the inverter. An amplitude and a phase of the output voltage of the inverter are adjusted based on the target output voltage, by using a first PI controller and a second PI controller respectively, so as to maintain the output voltage of the inverter within a preset range. It is not necessary to apply a droop control on the output voltage of the inverter, and therefore accuracy of the output voltage of the inverter is improved and robustness is improved.

The embodiments in this specification are described in a progressive manner, each of the embodiments emphasizes the differences between the embodiment and other embodiments, and the same or similar parts among the embodiments may be referred to each other. In particular, a system or system embodiments are described in a relatively simple manner as it is basically similar to the method embodiments, and reference may be made to a part of the description of the method embodiments for related description of the system or system embodiments. The system and system embodiments described above are merely illustrative, where the units described as separate components may or may not be physically separate, and the components displayed as units may or may not be physical units, that is, the components may be located in one place, or may be distributed to multiple network units. Some or all of the modules may be selected based on actual needs to achieve the objectives of the solutions of the embodiments. Those of ordinary skill in the art may understand and implement the present disclosure without any creative effort.

It may be further understood by those skilled in the art that units and algorithm steps described in combination with the disclosed embodiments may be implemented by electronic hardware, computer software or a combination thereof. In order to clearly describe interchangeability of the hardware and the software, the units and the steps are generally described above in view of their functions. Whether the functions being implemented by hardware or by software depends on applications of the technical solution and design constraints.

Those skilled in the art may use different methods for each particular application to implement the described functions, but such implementation should not be considered as going beyond the scope of the present disclosure.

The description of the embodiments herein enables those skilled in the art to implement or use the present disclosure. Many modifications to these embodiments are apparent for those skilled in the art. The general principles defined herein may be applied to other embodiments without departing from the spirit or scope of the present disclosure. Therefore, the present disclosure is not limited to the embodiments illustrated herein, but is to conform to the widest scope consistent with the principles and novel features disclosed herein.

The invention claimed is:

1. A method for controlling a voltage, the method being applied to a power supply network comprising a plurality of inverters connected in parallel, and the method comprising:
    acquiring a current output voltage of an inverter of the plurality of inverters;
    calculating a current voltage error of the current output voltage relative to a given output voltage;
    inputting the current voltage error into a fuzzy controller to determine a target output voltage of the inverter;
    determining, by using a first PI controller, an amplitude adjustment command based on a difference between an amplitude of the target output voltage and an amplitude of the current output voltage;
    determining, by using a second PI controller, a phase adjustment command based on a difference between a phase of the target output voltage and a phase of the current output voltage; and
    adjusting an amplitude of an output voltage of the inverter according to the amplitude adjustment command, and adjusting a phase of the output voltage of the inverter according to the phase adjustment command, to maintain the output voltage of the inverter within a preset range,
    wherein the inputting the current voltage error into a fuzzy controller to determine a target output voltage of the inverter comprises:
    calculating a difference between a previous voltage error and the current voltage error to determine a voltage error variation;
    performing, based on a preset fuzzy state universe, a fuzzification on the current voltage error and the voltage error variation;
    performing a fuzzy reasoning, by using a preset fuzzy control rule table, on the current voltage error after the fuzzification and the voltage error variation after the fuzzification, to determine a fuzzy value of a modulation degree of the fuzzy controller;
    performing a de-fuzzification on the fuzzy value of the modulation degree, to calculate the modulation degree; and
    determining, based on the modulation degree, the target output voltage of the inverter,
    wherein the determining, based on the modulation degree, the target output voltage of the inverter comprises:
    determining the target output voltage of the inverter by performing a sinusoidal pulse width modulation on the modulation degree.

2. The method according to claim 1, wherein the performing a de-fuzzification on the fuzzy value of the modulation degree, to calculate the modulation degree comprises:
    calculating the modulation degree of the fuzzy controller as $$Z = \frac{\sum x_i \times \omega_i}{\sum \omega_i},$$

where, Z is the modulation degree of the fuzzy controller obtained by performing the de-fuzzification on the fuzzy value of the modulation degree with a weighted average method, $\chi_i$ represents the i-th fuzzy value of the modulation degree, and $\omega_i$ represents a weight corresponding to the i-th fuzzy value of the modulation degree, i is a positive integer, and $\Sigma \chi_i \times \omega_i$ is to summarize values of $\chi_i \times \omega_i$ when i changes from a beginning number to an end number, $\Sigma \omega_i$ is to summarize values of $\omega_i$, when i changes from a beginning number to an end number.

3. A system for controlling a voltage, the system being applied to a power supply network comprising a plurality of inverters connected in parallel, and the system comprising a processor and a memory, wherein the processor is configured to execute instructions in the memory to perform the method according to claim 1.

* * * * *